May 28, 1935.  H. A. DOUGLAS  2,002,528
AEROPLANE STEERING MECHANISM
Filed Oct. 5, 1931  2 Sheets-Sheet 1
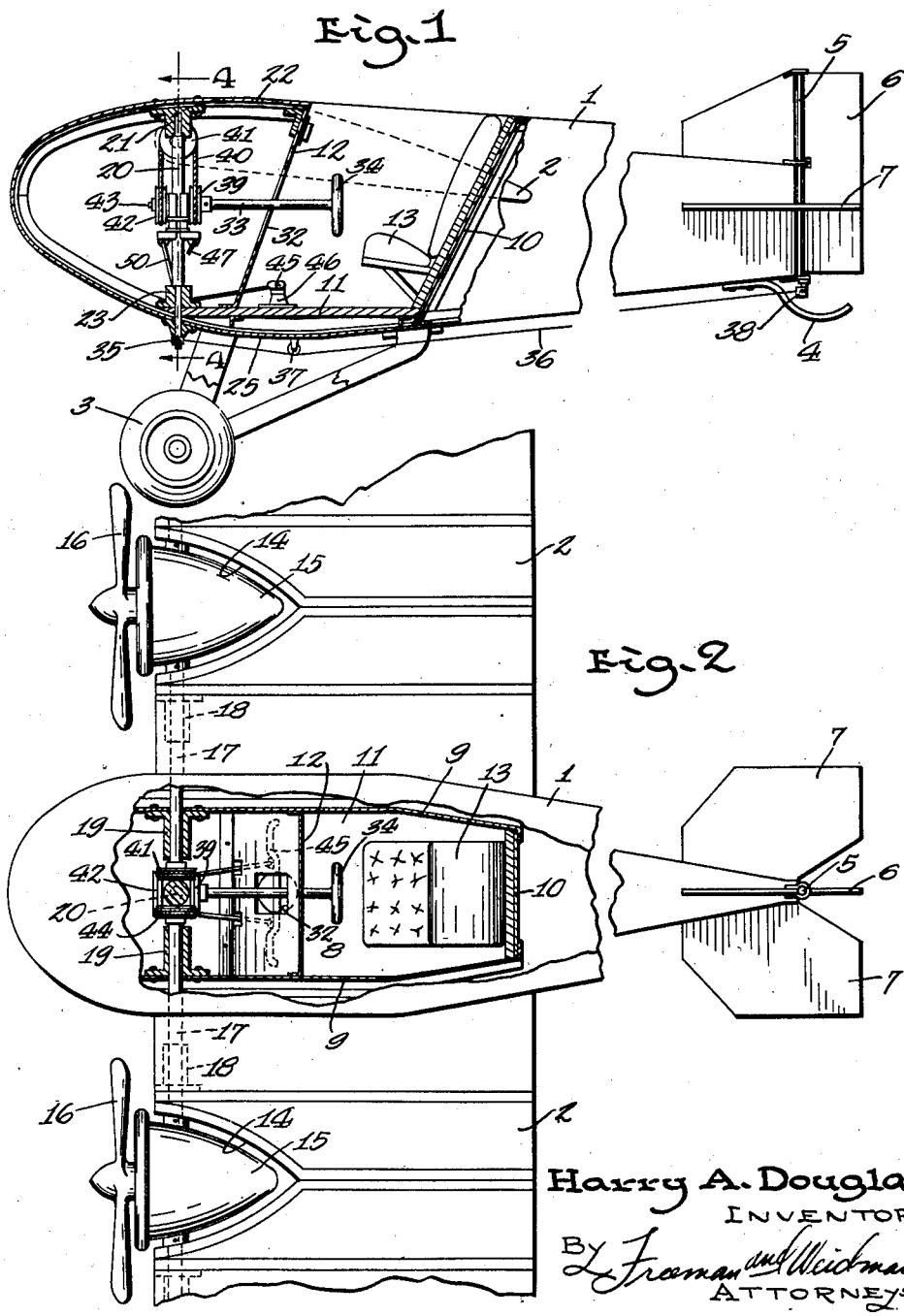
Harry A. Douglas
INVENTOR
By Freeman and Weidman
ATTORNEYS

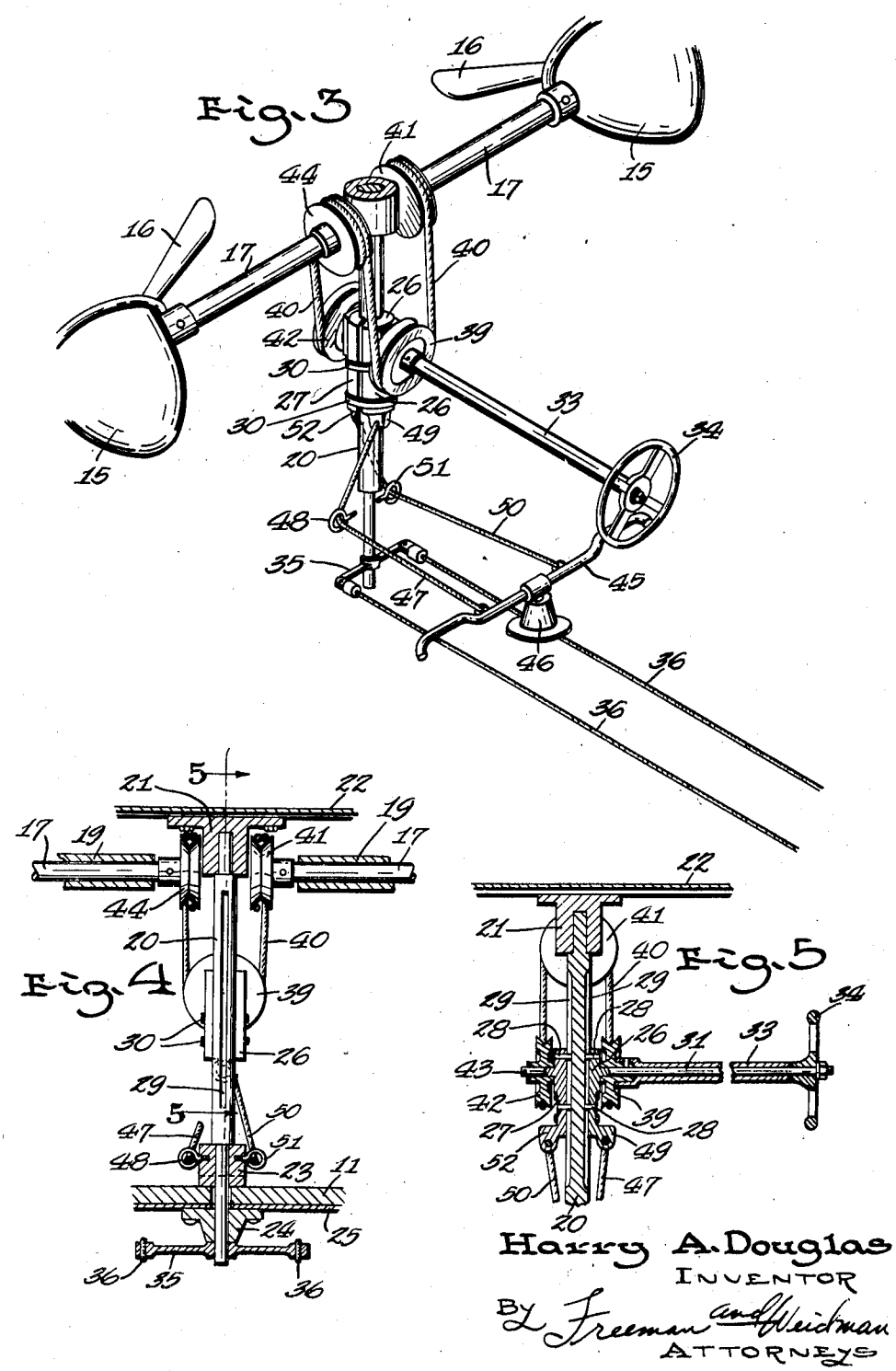

Patented May 28, 1935

2,002,528

UNITED STATES PATENT OFFICE 2,002,528

AEROPLANE STEERING MECHANISM

Harry A. Douglas, Bronson, Mich.

Application October 5, 1931, Serial No. 566,933

5 Claims. (Cl. 244—25).

This invention relates to aeroplanes, and has for its object the provision of an improved apparatus for steering an aeroplane.

In the drawings accompanying this specification and forming a part of this application, I have shown, for the purpose of illustration, one form which my invention may assume, and in these drawings:

Figure 1 is a view, partly in side elevation and partly in vertical longitudinal section, of an aeroplane embodying my invention, Figure 2 is a fragmentary plan view, with parts broken away, of the structure illustrated in Figure 1, Figure 3 is a perspective view of my improved steering mechanism, Figure 4 is an enlarged vertical sectional view taken on the line 4—4 of Figure 1, while Figure 5 is a vertical sectional view taken on the line 5—5 of Figure 4.

Referring to the drawings, an aeroplane constructed in accordance with my invention, is shown as comprising a fuselage 1, wings 2, a suitable landing gear 3, and a tail-skid 4. A vertically extending rudder post 5 is pivotally mounted on the trailing end of the fuselage 1, and carries a rudder 6 which cooperates with horizontal stabilizers 7 at each side thereof, in steering the aeroplane while in flight.

The fuselage 1 is provided with the usual cockpit 8 having side walls 9, a rear wall 10, a floor 11, and an instrument board 12, and is provided with the usual pilot's seat 13.

The wings 2 of the aeroplane are of the usual streamline configuration in cross-section, and are each provided with recesses 14 in their leading edges adapted to receive motors 15 which are provided with propellers 16. The motors 15 are carried by rock-shafts 17 which are journaled in bearings 18 carried by the wings 2 and bearings 19 secured to the side walls 9 of the cockpit 8.

A vertically extending rock-shaft 20 is journaled at its upper end in a bearing 21 secured to the upper wall 22 of the fuselage 1 between the inner ends of the rock-shafts 17 and at its lower end is journaled in bearings 23 and 24 secured to the floor 11 of the cockpit 8, and to the bottom wall 25 of the fuselage 1 respectively.

Mounted on the rock-shaft 20 for independent vertical sliding movement is a pair of shoes 26 and 27 each provided with keys 28 for sliding engagement with key-ways 29 provided in the rock-shaft 20. These shoes are held against displacement from the rock-shaft 20 by means of a pair of rings or bands 30 each secured to one of said shoes for sliding engagement with the other.

Fixed to the shoe 26 is a shaft 31 which extends rearwardly through an opening 32 provided in the instrument board 12, and which carries a rotatable sleeve 33 provided with a steering wheel 34 in a position where it may be readily manipulated from the pilot's seat 13.

Secured to the extreme lower end of the rock-shaft 20 is a transversely extending lever 35 to the ends of which are secured cables 36 which extend rearwardly beneath rollers 37 secured to the bottom wall 25 of the fuselage 1, and which are secured at their rear ends to a lever 38 fixed to the lower end of the rudder post 5. By means of this construction, the rudder 6 may be swung about the post 5 in order to steer the aeroplane laterally, by swinging the steering wheel 34 and sleeve 33 bodily in a horizontal direction in order to rock the shaft 20 and levers 35 and 38.

A pulley 39 is fixed to the forward extremity of the sleeve 33 which is frictionally engaged by an endless cable 40 which extends upwardly and twice around a pulley 41 fixed to the inner end of one of the rock-shafts 17, thence downwardly and beneath the pulley 42, which is mounted upon a stud 43 carried by the shoe 27, thence upwardly and twice around a pulley 44 fixed to the inner end of the other rock-shaft 17, and thence downwardly and around the pulley 39.

It will be apparent that by rotating the steering wheel 34 one way or the other, the rock-shafts 17 will be rocked in opposite directions, and tilt the motors 15 and the propellers 16 vertically in opposite directions, thus causing the aeroplane to tilt laterally, or bank one way or the other while in flight. In this respect, the motors and propellers function similarly to the usual ailerons in causing the aeroplane either to bank or to maintain an even keel.

The aeroplane is steered vertically by means of a transversely extending foot-controlled lever 45 which is mounted intermediate its ends for horizontal swinging movement on a bearing 46 secured to the floor 11 of the cockpit 8 and within easy reach of the pilot. A cable 47 is connected to one side of the lever 45 and passes forwardly and through an eye 48 carried by the bearing 23, and thence passes upwardly and is secured to a lug 49 provided on the lower end of the shoe 26. A cable 50 is also connected to the other end of the foot-controlled lever 45 and passes forwardly and through an eye 51 also secured to the bearing 23, and thence passes upwardly and is secured to a lug 52 provided on the lower end of the shoe 27. By means of this particular construction, when the foot-controlled lever 45 is swung horizontally about its pivot 46 in either direction, the shoes 26 and 27, together with the parts carried thereby, will be shifted vertically in opposite directions, thereby causing the pulleys 41 and 44, the rock-shafts 17, and the motors 15 to rotate in the same direction, thus tilting the propellers 16 vertically in the same direction simultaneously, so as to alter the flight of the aeroplane vertically. When the foot-controlled lever 45 is thus operated, the steering wheel 34 will of course move vertically, but this movement of the steering wheel 34 is not sufficient to disturb its operative position relative to the pilot.

From the foregoing, it will be apparent that by swinging the steering wheel 34 bodily in a horizontal direction, the rudder 6 is operated in order to steer the aeroplane laterally; that by rotating the steering wheel 34, the rock-shafts 17 and motors 15 carried thereby are swung in opposite directions in order to tilt the propellers 16 vertically in opposite directions, thus causing the aeroplane to bank; and that by manipulating the foot-controlled lever 45 the rock-shafts 17 are rocked in the same direction so as to tilt the propellers 16 vertically in the same direction, thereby changing the flight of the aeroplane vertically.

From the above description, it will be obvious to those skilled in the art that I have accomplished at least the principal object of my invention, and further apparent that the invention embodies other advantages and uses not herein particularly referred to, and it will also be apparent that many changes and modifications of the embodiments herein disclosed may be made without departing from the spirit of the invention; hence it will be understood that the embodiments are illustrative only; and that my invention is not limited thereto.

I claim:

1. An aeroplane steering mechanism, comprising: rudder means; a plurality of propeller means, each movable in a definite path; and interconnected control means connected with said propeller means and with said rudder means, said control means being operable to adjust said rudder means, and also operable to move said propeller means in opposite directions in said paths and simultaneously operable to move said propeller means in the same direction in the same paths, said control means also having mechanism operable to independently change the relative positions of said propeller means in any position of adjustment.

2. An aeroplane steering mechanism, comprising: rudder means; propeller means; and control means including rock-shafts connected to said propeller means; a support; relatively shiftable members carried by said support, and connected with said rudder means, and connectors connecting said rock-shafts with said members, shifting of said members relatively to each other effecting rocking movement of said rock-shafts and shifting of the position of said propeller means, and also effecting movement of said rudder means.

3. An aeroplane steering mechanism, comprising: propeller means; a support; and control means including relatively shiftable members carried by said support, and simultaneously operable rotatable means; and connecting means operatively connecting said control means to said propeller means, whereby relative shifting of said members effects movement of said propeller means in the same direction, and rotation of said rotatable means effects movement of said propeller means in opposite directions, thus to affect the direction of flight of said aeroplane.

4. An aeroplane steering mechanism, comprising: rudder means; propeller means; a support; and control means including members carried by said support, rotatively mounted and shiftable with respect to each other, and rotatable means; and connecting means cooperatively connecting said control means to said rudder means and said propeller means, whereby relative shifting of said members effects movement of said propeller means in the same direction, rotation of said members operates said rudder means, and rotation of said rotatable means effects movement of said propeller means in opposite directions, said members and rotatable means being adapted to be operated simultaneously.

5. An aeroplane steering mechanism, comprising: rudder means; a plurality of movable propeller means; supporting means; rotatable control means mounted on said supporting means for vertically shiftable and laterally swingable movement, said control means being operatively connected with said propeller means and said rudder means, whereby rotation of said control means effects movement of said propeller means in opposite directions with respect to each other, vertical shifting of said control means effects movement of said propeller means in the same direction with respect to each other, and lateral swinging of said control means effects movement of said rudder means.

HARRY A. DOUGLAS.